United States Patent
Betz

(10) Patent No.: US 10,072,597 B2
(45) Date of Patent: Sep. 11, 2018

(54) METHOD AND CONTROL DEVICE FOR OPERATING AN INTERNAL COMBUSTION ENGINE

(71) Applicant: Marius Betz, Langenargen (DE)

(72) Inventor: Marius Betz, Langenargen (DE)

(73) Assignee: MAN Energy Solutions SE, Augsburg (DE)

( * ) Notice: Subject to any disclaimer, the term of this patent is extended or adjusted under 35 U.S.C. 154(b) by 0 days.

(21) Appl. No.: 14/930,796

(22) Filed: Nov. 3, 2015

(65) Prior Publication Data
US 2016/0123263 A1 May 5, 2016

(30) Foreign Application Priority Data
Nov. 5, 2014 (DE) .................. 10 2014 016 398

(51) Int. Cl.
| | |
|---|---|
| *B60T 7/12* | (2006.01) |
| *F02D 41/24* | (2006.01) |
| *G01L 3/24* | (2006.01) |
| *F02D 41/02* | (2006.01) |

(52) U.S. Cl.
CPC ..... *F02D 41/2432* (2013.01); *F02D 41/2467* (2013.01); *G01L 3/24* (2013.01); *F02D 41/0205* (2013.01); *F02D 2200/101* (2013.01); *F02D 2200/1002* (2013.01)

(58) Field of Classification Search
CPC ... B60W 2510/0623; B60W 2710/0627; F02D 19/023; F02D 19/061; F02D 2700/0282; F02D 19/081; F02D 2009/023; F02D 2200/10

USPC ........ 701/103, 104; 123/434, 679, 680, 681, 123/685, 687, 690
See application file for complete search history.

(56) References Cited

U.S. PATENT DOCUMENTS

| | | | |
|---|---|---|---|
| 2003/0109977 A1* | 6/2003 | Landes | F02D 41/083 701/54 |
| 2004/0090195 A1* | 5/2004 | Motsenbocker | B63B 43/18 318/109 |
| 2016/0131068 A1* | 5/2016 | Hardy | F02D 41/2477 701/115 |
| 2016/0131069 A1* | 5/2016 | Wackerle | F02D 41/2429 701/115 |
| 2017/0234245 A1* | 8/2017 | Bruner | F02D 19/081 123/525 |

* cited by examiner

*Primary Examiner* — John Kwon
(74) *Attorney, Agent, or Firm* — Cozen O'Connor

(57) ABSTRACT

A method for operating an internal combustion engine, such as a marine diesel engine, that is operative for rotating an output shaft of the engine in a normal operating mode for generating a desired output power based on an operating fuel quantity introduced into the engine. The engine is operated in a calibration mode at a defined rotational speed of the output shaft, and a calibrating fuel quantity introduced into the engine to maintain the defined rotational speed in the calibration mode is determined. In the normal operating mode of the engine, the engine output power is determined based on the operating fuel quantity being introduced into the engine in the normal operating mode and the calibrating fuel quantity determined in the calibration mode.

8 Claims, 1 Drawing Sheet

METHOD AND CONTROL DEVICE FOR OPERATING AN INTERNAL COMBUSTION ENGINE

BACKGROUND OF THE INVENTION

1. Field of the Invention

The present invention is directed to a method for controlling the operation of an internal combustion engine to generate a desired output power based on the amount of fuel supplied to the engine, and to a control device for implementing and carrying out the inventive method.

2. Background of the Invention

In practice it is known that during normal operation of an internal combustion engine, such by way of example a marine diesel-type internal combustion engine or other large engine, the power output of the internal combustion engine is dependent on the quantity or amount of operating fuel that is introduced, such as injected into, the operating engine. Accordingly, the output power of an internal combustion engine can be controlled by sensing or monitoring, and adjusting, the amount of fuel that is introduced into the engine to operate it in a power-controlled manner. Using this prior art procedure to control the output power available from a normally operating internal combustion engine, however, in practice yields great uncertainties and inaccuracies in the generated output power because of differences in the characteristics and the like of the fuel being used and continuing wear within the fuel supply system of the engine, as a result of which optimal regulation of engine operation is, most commonly, not practically attainable. There is therefore a need for a method and a controller which enable the output power developed or made available by an internal combustion engine during its normal operation to be more accurately anticipated and realized.

SUMMARY OF THE INVENTION

In accordance with the present invention, an internal combustion engine is operated at a defined output shaft rotational speed in a calibration mode, during which a calibrating fuel quantity being the fuel required to operate the engine at the defined rotational speed is determined. The output power made available in normal operation of the engine and dependent on the amount of fuel introduced into the engine in the normal operating mode can then be anticipated and provided based on the generated engine power using the calibrating fuel quantity as theretofore identified.

Thus, an initial determination during the calibration mode of the internal combustion engine of the calibrating fuel quantity enables determination of the amount of engine power being generated in the calibration mode and the dependency of operating power to input fuel quantity. This makes it possible to take into account, in successive operation of the internal combustion engine in its normal operating mode, differences in engine power that result, when operating on a particular quantity or amount of fuel, from differences or variations in the fuel and the wear of the engine's fuel supply system, and to thereby more accurately determine the power generated or being made available by the internal combustion engine in its normal operating mode for the amount of fuel that is input to the engine. Ultimately, the invention thus enables more efficient operation of the internal combustion engine.

In preferred embodiments of the invention, the power made available by the internal combustion engine in its normal operating mode is determined as a function of the operating fuel quantity introduced to the engine, with the assistance of a predetermined characteristic that is calibrated based on the calibrating fuel quantity identified or determined in the calibration mode. Determining of the power made available by the internal combustion engine in its operating mode on the basis of such a characteristic, in accordance with which the operating fuel quantity is entered and the characteristic is calibrated using the calibrating fuel quantity determined in the calibration mode, is simple and reliable.

The internal combustion engine is in a preferred implementation operated with a defined output shaft idle rotational speed at zero load in the calibration mode and, in the process, the calibrating fuel quantity which the internal combustion engine requires for maintaining the idle rotational speed is determined. A particularly simple and advantageous calibration methodology utilizing the calibrating fuel quantity is thereby enabled.

Thus, the internal combustion engine is preferably operated in the calibration mode in a rotational speed-controlled manner. This permits a particularly advantageous and easily effected determination of the calibrating fuel quantity.

It is generally preferred that the internal combustion engine is operated in the calibration mode immediately after starting up or, alternately, before shutting down the engine. This ensures that the regular or normal operating mode of the engine is not impaired by the calibrating operation in the calibration mode.

In preferred embodiments of the invention, the calibrating fuel quantity is corrected based on a measured and/or calculated fuel viscosity and/or on a measured and/or calculated fuel temperature. The calibrating fuel quantity can thereby be determined with notably enhanced accuracy, thereby permitting still greater accuracy of operation of the internal combustion engine in its normal operating mode.

These and other objects and features of the present invention will become apparent from the following detailed description considered in connection with the accompanying drawings. It is to be understood, however, that the drawings are designed solely for purposes of illustration and not as a definition of the limits of the invention, for which reference should be made to the appended claims.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PRESENTLY PREFERRED EMBODIMENTS

The present invention relates to a method for operating an internal combustion engine, in particular a large engine such as a marine diesel-type internal combustion engine, and to a control device for implementing and carrying out the inventive method.

In a normal or regular operating mode of an internal combustion engine, fuel is introduced, as for example injected, into cylinders of the engine with the assistance of a fuel supply system. The operating fuel quantity introduced into the internal combustion engine can be determined and, dependent on the fuel quantity so introduced, the output power currently being generated or made available by the engine in its normal operating mode can be determined.

Figure 1:
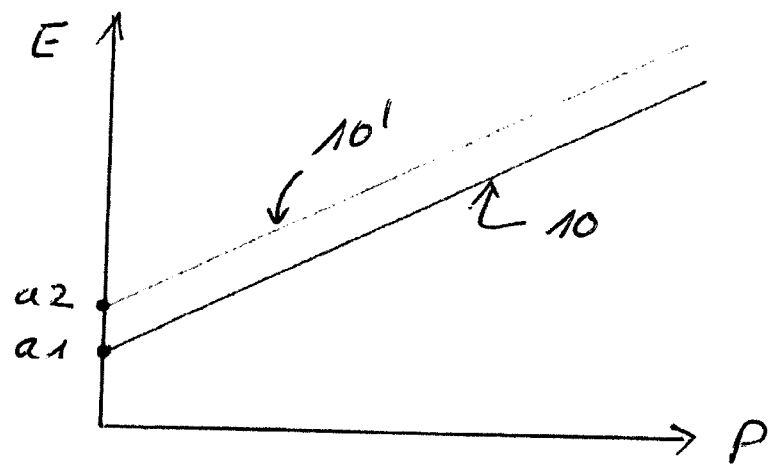
FIG. 1 graphically depicts a linear relationship characteristic plot of engine power (P) vs operating fuel quantity (E)

FIG. 1 is a graph depicting the relationship of a characteristic 10, with the assistance of which the power P made available by the internal combustion engine in its normal operating mode can be determined as a function of the operating fuel quantity E that is introduced into the internal combustion engine. As will be apparent, the characteristic 10 depicted in FIG. 1 is a linear dependency between the operating fuel quantity E and the output power P that is generated by the engine.

The output power P of the internal combustion engine is thus determined in the normal operating mode of the engine using the characteristic 10, which is based on the following linear dependency:

$$P = a + b*E,$$

wherein E is the operating fuel quantity, and a and b are constants of the linear dependency.

In FIG. 1, the constant a corresponds to the fuel quantity required by the internal combustion engine in no-load operation, i.e. with zero load. The constant b corresponds to the gradient of this linear dependency.

The available output power P can also be determined on the basis of the operating fuel quantity E that is introduced into the internal combustion engine even via a non-linear dependency for a particular usage or application.

In accordance with the inventive method, the internal combustion engine output shaft is operated at a defined rotational speed in a calibration mode, and the calibrating fuel quantity used by the engine to maintain that speed is determined. Preferably, the internal combustion engine is operated in this calibration mode at a defined idle rotational speed at zero load, i.e. in a no-load operating condition or mode. Thus, the calibrating fuel quantity that the internal combustion engine requires to maintain the idle rotational speed at zero load is determined in this calibration mode of engine operation.

Utilizing a linear dependency between the available engine output power P and the operating fuel quantity E introduced into the engine in the calibration mode, as shown in FIG. 1, enables calculation of the constant a of the linear dependency and, thereby, calibration of the linear dependency of FIG. 1. Two constants a1 and a2 are identified in FIG. 1, wherein the calibrated characteristic 10' is obtained by a parallel shift of the previously valid characteristic 10 such that the calibrated characteristic 10' runs through the value a2 which has been determined in the current or most recent calibration mode operation. The value a2 corresponds to the calibrating fuel quantity, which the internal combustion engine requires at zero load for maintaining the defined idle rotational speed.

It is further preferred that, in the calibration mode of the internal combustion engine, the engine is operated in a rotational speed-controlled manner.

The calibration mode of the internal combustion engine is preferentially initiated immediately following engine startup in order to recalibrate the characteristic for determining the available output power P after every start-up of the engine and to thus ensure optimal operation of the engine when it is then operated in its normal operating mode.

The present invention renders possible, in the normal operating mode of an internal combustion engine, a more accurate determination of the available engine output power, based on the quantity of fuel being delivered or input to the engine, than is attainable in accord with the prior art. In particular, inaccuracies resulting from fuel fluctuations and/or wear in the fuel supply system can be effectively eliminated by implementing the calibration mode output power determination of the present invention.

In accordance with a further advantageous feature of the invention, the calibrating fuel quantity determined in the calibration mode can be corrected on the basis of a calculated and/or measured fuel viscosity and/or on the basis of a measured and/or calculated fuel temperature, thereby eliminating the influences of these factors or characteristics as the engine output power relationship is calculated and determined in the calibration mode of the inventive method and further enhancing the accuracy of the calculated dependency of output power as a function of operating fuel quantity during normal engine operation.

Figure 2:
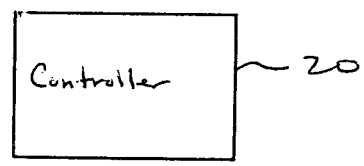
FIG. 2 diagrammatically depicts a control device for implementing and carrying out the method of the invention.

A control device constructed in accordance with the invention is implemented as an automated or semi-automated controller or controller means for carrying out the inventive method as herein described. The controller or controller means 20, diagrammatically depicted in FIG. 2, includes data interfaces for data exchange between the assemblies—such as sensors—involved in implementing and carrying out the method, a data storage unit for storage of data, and a processor for processing of the data, and may be constructed of known parts or elements or subassemblies as a general matter of design choice suitable, as will be apparent to those of ordinary skill in the art, to carry out the method of the invention.

While there have been shown and described and pointed out fundamental novel features of the invention as applied to preferred embodiments thereof, it will be understood that various omissions and substitutions and changes in the form and details of the methods and devices described, and in their practice and operation, may be made by those skilled in the art without departing from the spirit of the invention. It is the intention, therefore, to be limited only as indicated by the scope of the claims appended hereto.

I claim:

1. A method for operating an internal combustion engine, that is operative for rotating an output shaft of the engine, to enable selective operation of the engine in a normal operating mode for generating a desired output power by introducing a suitable quantity of operating fuel into the engine, comprising the steps of:

operating the engine in the normal operating mode at least at a defined rotational speed and at zero load to determine an initial output power to operating fuel quantity relationship;

storing the initial output power to operating fuel quantity relationship;

operating the engine in a calibration mode by operating the engine so that the engine output shaft rotates at the defined rotational speed and at zero load;

determining, in the calibration mode operation of the engine, a calibrating fuel quantity comprising the quantity of fuel being introduced into the engine to operate the engine at the defined rotational speed during the calibration mode at zero load;

determining a fuel quantity calibration offset based on the calibrating fuel quantity;

determining, in the normal operating mode of the engine, the output power being generated by the engine as a function of:
- the determined calibrating fuel quantity at the defined rotational speed and at zero load and
- the quantity of operating fuel being introduced into the engine in the normal operating mode at the defined rotational speed and at zero load; and operating the internal combustion engine at a modified output power to operating fuel quantity relationship comprising the initial output power to operating fuel quantity relationship and the calibration offset.

2. A method in accordance with claim 1, wherein said determining of the output power in the normal operating mode of the engine comprises determining the output power using a characteristic curve dependent on the operating fuel quantity introduced into the engine, the characteristic curve being calibrated using the determined calibrating fuel quantity.

3. A method in accordance with claim 2, wherein said determining of the output power in the normal operating mode of the engine comprises determining the output power based on a linear dependency of the operating fuel quantity introduced into the engine and the output power.

4. A method in accordance with claim 3, wherein the linear dependency comprises:

$$P=a+b*E,$$

wherein P is the output power of the engine, E is the operating fuel quantity and a and b are constants of the linear dependency, and wherein the constant a is determined based on the determined calibrating fuel quantity.

5. A method in accordance with claim 1, wherein in the calibrating mode of the engine the engine is operated in an output shaft rotational speed-controlled manner.

6. A method in accordance with claim 1, wherein the engine is operated in the calibration mode immediately after start-up of the engine.

7. A method in accordance with claim 1, further comprising the step of correcting the determined calibrating fuel quantity based on at least one of a measured fuel viscosity, a calculated fuel viscosity, a measured fuel temperature, and a calculated fuel temperature.

8. A control device of an internal combustion engine, comprising an automated controller for carrying out the method of claim 1.

* * * * *